United States Patent
Hubner et al.

(10) Patent No.: US 9,131,256 B2
(45) Date of Patent: Sep. 8, 2015

(54) METHOD AND APPARATUS FOR SYNCHRONIZING CONTENT PLAYBACK

(75) Inventors: Paul Hubner, McKinney, TX (US);
Erik A. Hubner, McKinney, TX (US);
Steven T. Archer, Dallas, TX (US);
Kristopher Pate, Flower Mound, TX (US); Robert A. Clavenna, Lucas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 265 days.

(21) Appl. No.: 12/895,495

(22) Filed: Sep. 30, 2010

(65) Prior Publication Data
US 2012/0082424 A1 Apr. 5, 2012

(51) Int. Cl.
| H04N 9/80 | (2006.01) |
| H04N 7/16 | (2011.01) |
| H04N 21/242 | (2011.01) |
| H04N 21/472 | (2011.01) |
| H04N 21/6405 | (2011.01) |

(52) U.S. Cl.
CPC ........... *H04N 21/242* (2013.01); *H04N 21/472* (2013.01); *H04N 21/6405* (2013.01)

(58) Field of Classification Search
USPC .................................. 386/200–234, 239–248
See application file for complete search history.

(56) References Cited

U.S. PATENT DOCUMENTS

| 6,330,214 | B1 * | 12/2001 | Ohta et al. .................... 369/47.3 |
| 6,516,005 | B1 * | 2/2003 | Murayama et al. ........... 370/503 |
| 7,934,239 | B1 | 4/2011 | Dagman |
| 8,464,298 | B1 | 6/2013 | Dagman |
| 8,736,700 | B2 * | 5/2014 | Cote et al. .................. 348/222.1 |
| 2003/0091322 | A1 * | 5/2003 | Van Der Schaar .............. 386/46 |
| 2003/0131045 | A1 * | 7/2003 | McGee et al. ................ 709/201 |
| 2003/0156827 | A1 * | 8/2003 | Janevski .......................... 386/96 |
| 2005/0289564 | A1 * | 12/2005 | Iriyama et al. ................ 720/600 |
| 2006/0149850 | A1 * | 7/2006 | Bowman ....................... 709/231 |
| 2006/0156374 | A1 * | 7/2006 | Hu et al. ....................... 725/135 |
| 2007/0184805 | A1 * | 8/2007 | Zhu et al. ...................... 455/306 |
| 2008/0168486 | A1 * | 7/2008 | Song et al. ...................... 725/28 |
| 2008/0225826 | A1 * | 9/2008 | Gentric ......................... 370/350 |
| 2009/0164655 | A1 * | 6/2009 | Pettersson et al. ............ 709/231 |
| 2010/0100917 | A1 * | 4/2010 | Chiao et al. .................. 725/110 |
| 2012/0311043 | A1 * | 12/2012 | Chen et al. .................... 709/204 |

* cited by examiner

*Primary Examiner* — Hung Dang

(57) ABSTRACT

An approach for facilitating the playback of content concurrently on multiple devices is described. A time reference associated with a first device is provided to a synchronization platform for corresponding to playback of content on the first device. The synchronization platform also receives a request from a second device to synchronize concurrent playback of a version of the content on the second device. Timing information is generated for transmission to the second device in response to the request for enabling the second device to playback its version of the content in synchronization with that of the first device.

18 Claims, 9 Drawing Sheets

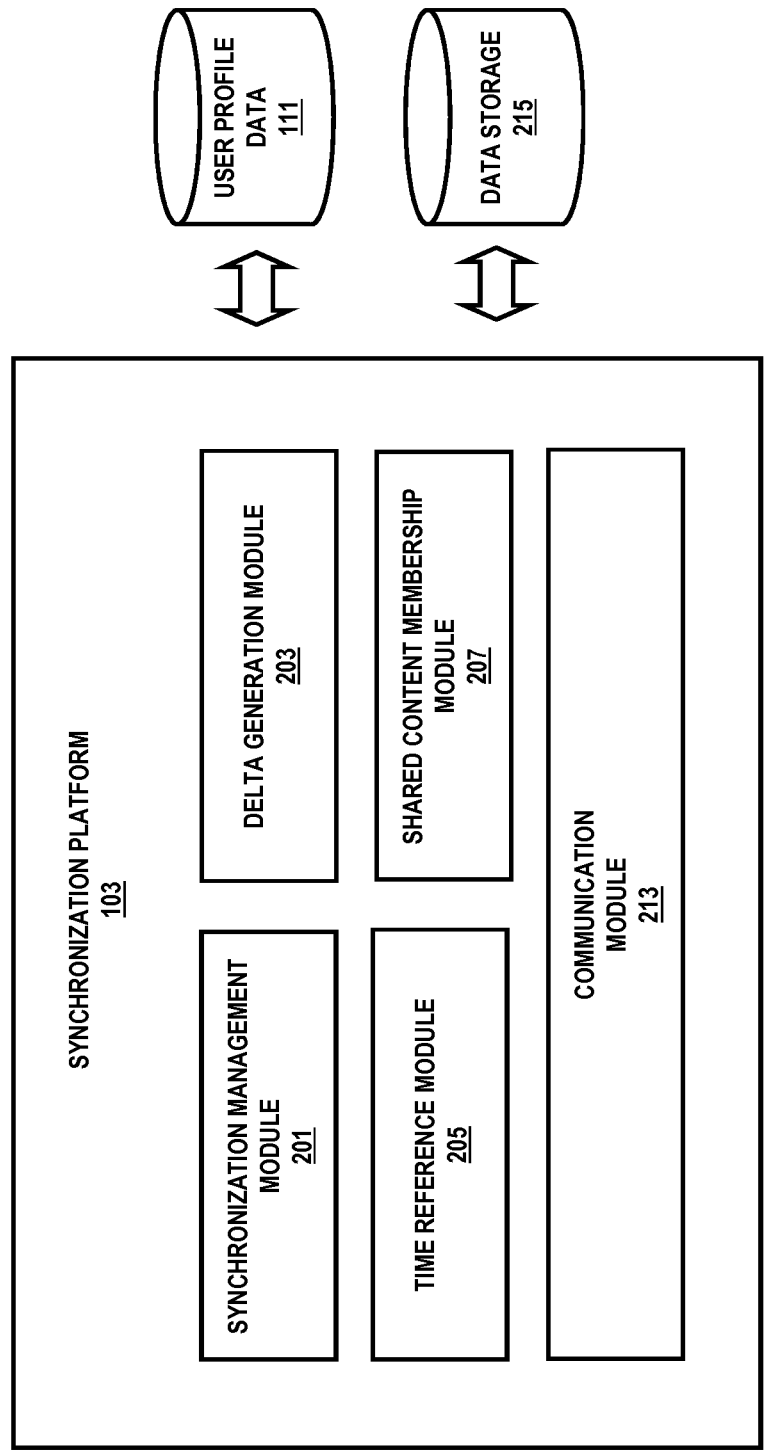

METHOD AND APPARATUS FOR SYNCHRONIZING CONTENT PLAYBACK

BACKGROUND INFORMATION

In today's fast-paced, information-driven culture, the publishing and sharing of the same content with multiple device users is facilitated through various information dissemination and communication techniques, including podcasting, really simple syndication (RSS) feeding, streaming media and the like. In general, "broadcast content" is meant to be consumed by multiple individual devices simultaneously, whereas "unicast media" targets a single user or device. The ubiquity of mobile media capable devices, such as smartphones, personal digital assistants (PDAs), tablet PCs, wireless media players, etc., has increased the consumption of unicast media, providing users with great flexibility in selection of content and scheduling of playback of such content. For instance, users can routinely request music and video content to be streamed or downloaded to their devices. However, little or no attention has been paid to the user experience when these users wish to consume content "together." With current systems, there is no coordination of the playback of media in a group setting, in large part, because the media can originate from different sources, or can even be slightly different versions of the content (e.g., different viewing formats, etc.). Users would need to manually coordinate the playback using traditional controls (e.g., pause, fast forward, review, and play). Even if manual synchronization of the starting points can be accurately achieved, this manual process is at best cumbersome to perform, and thus, detracts from the user viewing experience. As such users would need to resort to sharing a single device, assuming this option is available. Otherwise, a shared experience is forgone.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 2A and 2B are, respectively, a diagram of a synchronization platform, and a typical user device utilized in the system of FIG. 1, in accordance with various embodiments;

DESCRIPTION OF THE PREFERRED EMBODIMENT

A preferred apparatus, method and software for synchronizing playback of content on multiple devices is described.

In the following description, for the purposes of explanation, numerous specific details are set forth to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Figure 1:
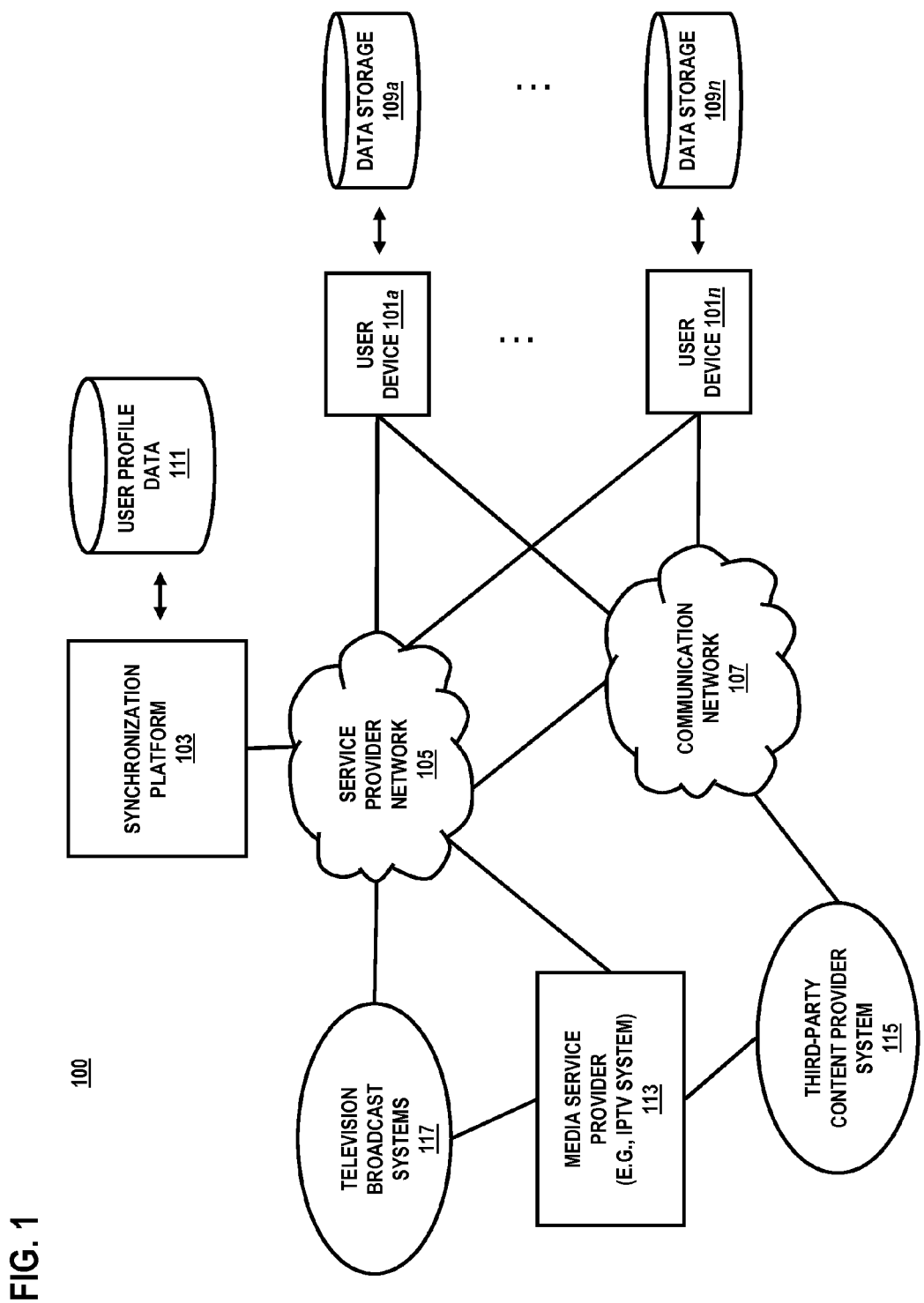
FIG. 1 is a diagram of a system capable of facilitating synchronization of content playback within a group of user devices, in accordance with an exemplary embodiment.

FIG. 1 is a diagram of a system capable of facilitating synchronization of content playback within a group of user devices, in accordance with an exemplary embodiment. In various embodiments, system 100 enables content to be directed to one or more user devices 101a-101n by a media services provider 113. Content is acquired by respective user devices 101a-101n from over a service provider 105 and/or communication network 107 by way of various content syndication, publication or transmission means, including streaming media, broadcast media, downloadable content, web feed, portal access or the like. Once received, content is then stored by the devices 101a-101n in data storage 109a-109n accordingly or played back as streaming data; data storage 109a-109n can take various forms of memory, as explained with respect to FIGS. 7 and 8, or be external to the user devices 101a-101n. In certain embodiments, "content" or "media content" is any data capable of being rendered, played, presented and/or manipulated by the device. Such content may include, but is not limited to, video and audio data, streaming data, data files, object code, image data, contextual and semantic data, textual data, media data, etc. Generally, content intended for playback, or otherwise presentation, by a receiving user device 101 is executed by a media player, audio player, video player or other like application. Any means of enabling the delivery and execution of streamed and/or non-streamed content over a service provider 105 or communication network 107 is relevant to the exemplary embodiments as described.

Typically, content is delivered to respective devices 101a-101n on an individual basis, such as by way of unicast media transmission. In certain embodiments, unicast pertains to means of communicating data between a single sender (e.g., media service provider 113 or third-party content provider 115) and a single receiver (e.g., user device 101) over a network 105 and 107. Unicasts allow individual device users to control the access to and playback of streaming media or other content made available by a provider on demand. Hence, content presented to a user of user device 101 by way of unicast is suitable for individual devices as it is intended primarily for accommodating independent content playback. It is difficult, however, for a select group of device users to retrieve the same unicast feed for individual yet simultaneous playback of content. This is especially true when the devices are within close proximity of one another, due primarily to audio interference and content mismatch, for example. Because each audio feed may execute content at different rates or start times, the result is disjointed and distracting audio playback by the respective devices rather than a succinct, unified sound. Still further, because devices feature different content buffer settings, the rate at which they playback content varies. Thus, it is difficult for a group of user devices to consume and execute content intended for individual consumption in a synchronized manner. For instance, when a group of device users—i.e., at a party or a meeting—want to coordinate playback of the same content (or a version thereof) on their devices at the same time, effective content execution is inhibited due to playback buffer mismatch or audio interference.

By way of example, one device 101a may be configured with a larger content playback buffer while a second device 101n is configured with a smaller buffer. The content buffer refers to the amount of memory allocated to temporarily store content accessed over the communication network 107 (e.g., streaming media) and or service provider network 105 for use by an application running on the device, such as a media player or other application. When buffers differ in size, the capacity and rate of content access by respective user devices 101a-101n also differ. Consequently, the user device 101a with the larger buffer is able to receive content at greater bit rates than that with a smaller buffer and hence, accommodate faster and more continuous playback of content. This disparity complicates the coordination of simultaneous (or concurrent), synchronized execution of content on respective devices 101a-101n.

Still further, lack of synchronized playback of respective user device 101 results in audio interference or playback mismatch, wherein the execution of audio content on one device 101a diminishes rather than reinforces the sound of the same content (or version thereof) being played on another device 101n. By way of example, a slight difference (e.g., in milliseconds) in audio execution between devices 101a-101n playing the same content (or version thereof) leads to audible mismatch, repetitive sound gestures, looping, distortion of certain sounds and other undesirable playback effects. This problem is magnified in instances where several devices attempt to engage in audible playback simultaneously; each audio feed being a distraction to the other rather than concerted to produce a single unified sound. Ultimately, when a group of users operating user devices 101 attempt to execute the same content (or version thereof) with no means of enabling playback parity on respective devices, the group content experience is jeopardized.

To address this issue, the system of FIG. 1 allows users to synchronize unicast feeds and other media intended for individual device consumption among a group of devices 101a-101n by, for example, dynamically altering the buffer depth of respective devices 101 and actively checking and/or generating a synchronization state of all devices 101. Devices 101a-101n that are actively configured to, registered with or subscribers of the service provider 105 or communication network 107 may access a synchronization platform 103 as a service for enabling shared content communication among similarly configured or subscribing devices. The synchronization platform 103 maintains user profile data 111 that specifies parameters relating to the user's requirements and preferences for enabling a subscribing device to readily engage participating devices for sharing synchronized content. By way of example, these parameters may indicate participating devices (i.e., participant devices) that are associated with the user's social group or community. Participating devices may include any device configured to the synchronization platform 103 (e.g., or subscribed with a service provider thereof), including those devices that are within a predetermined proximity of one another. It is noted that the predetermined proximity or range of interacting devices can be adjusted based on user profile data 111 maintained for a subscribing user. Proximity settings may be defined by zone—i.e., local, domestic, international, limited to a specific area, premise or sensor range, or adapted dynamically based on determined network conditions.

By way of example, the synchronization platform 103 maintains data representative of a time differential between respective devices wishing to share and perform playback of the same content at the same time. In addition, the synchronization platform 103 also maintains data regarding respective playback buffer capacities of the differing user devices 101a-101n. This information can be associated with a user profile data 111 (e.g., associated with an established user account). The user profile 111 can also specify the same data as it pertains to all participating users and devices associated with a particular user account, i.e., as a buddy list. The buffer data and content playback time differential information is subsequently shared with each device 101 for enabling each to adjust its settings in a manner that achieves synchronized playback of content. Synchronized playback of content, as presented with respect to various embodiments, includes the consumption and provisioning of content to multiple devices 101a-101n as well as the execution of content by the multiple devices 101a-101n to ensure equivalent playback of audio, visual, textual or contextual information to the devices at the same time. It is noted and discussed later on that the synchronization process also accounts for a content playback delay time as may be caused due to inherent network latencies, differences in proximity of participating devices, etc.

In certain embodiments, user devices 101a-101n, the synchronization platform 103 and other elements of system 100 may be configured to communicate via one or more of networks 105 and 107. System 100 can include: a public data network (e.g., the Internet), various intranets, local area networks (LAN), wide area networks (WAN), the public switched telephony network (PSTN), integrated services digital networks (ISDN), other private packet switched networks or telephony networks, as well as any additional equivalent system or combination thereof. These networks may employ various access technologies including cable networks, satellite networks, subscriber television networks, digital subscriber line (DSL) networks, optical fiber networks, hybrid fiber-coax networks, worldwide interoperability for microwave access (WiMAX) networks, wireless fidelity (WiFi) networks, other wireless networks (e.g., 3G wireless broadband networks, mobile television networks, radio networks, etc.), terrestrial broadcasting networks, provider specific networks (e.g., fiber optic networks, cable networks, etc), and the like. Such networks may also utilize any suitable protocol supportive of data communications, e.g., transmission control protocol (TCP), internet protocol (IP), file transfer protocol (FTP), telnet, hypertext transfer protocol (HTTP), hypertext transfer protocol secure (HTTPS), asynchronous transfer mode (ATM), socket connections, Ethernet, frame relay, and the like, to connect user devices 101a-101n to various sources of media content, such as one or more third-party content provider systems 115. Although depicted in FIG. 1 as separate networks, communication network 107 may be completely or partially contained within service provider network 105. For example, service provider network 105 may include facilities to provide for transport of packet-based communications.

It is noted, though not shown in the figure, that in certain embodiments user devices 101a-101n may be configured to establish connectivity with one another via a local area network (LAN) for providing one or more wireless connections. By way of example, a group of user devices 101a-101n may be configured to the LAN configured to a meeting room, conference room, classroom or other premise so that each device can be uniquely identified by LAN via any suitable addressing scheme. For example, the LAN may utilize the dynamic host configuration protocol (DHCP) to dynamically assign "private" DHCP internet protocol (IP) addresses to each user device 101, i.e., IP addresses that are accessible to devices connected to the network 105 and 107 as facilitated via router.

Additionally, devices 101a-101n may be configured to communicate with and receive signals and/or data streams from media service provider (MSP) 113 or other transmission facility in addition to third-party content provider system 115. These signals may include media content retrieved over a data network (e.g., service provider network 105 and/or communication network 107), as well as conventional video broadcast content. In certain embodiments, media content broadly includes any audio-visual content (e.g., broadcast television programs, VOD programs, pay-per-view programs, IPTV feeds, DVD related content, etc.), pre-recorded media content, data communication services content (e.g., commercials, advertisements, videos, movies, songs, images, sounds, etc.), Internet services content (streamed audio, video, or image media), and/or any other equivalent media form. In this manner, MSP 113 may provide (in addition to their own media content) content obtained from sources, such as one or more third-party content provider systems 115, one or more television broadcast systems 117, etc., as well as content available via one or more communication networks 107, etc. For the purposes of illustration, "content" is taken to include "media content" as well.

FIG. 2A is a diagram of a synchronization platform configured to facilitate the delivery of synchronized content to a group of user devices 101a-101n, in accordance with an exemplary embodiment. The synchronization platform 103 includes various executable modules for performing one or more computing and processing instructions that in combination, provides a means of content execution parity to be achieved among the user devices 101. Such modules can be implemented in hardware, firmware, software, or a combination thereof. Execution of modules 201-213 of the synchronization platform 103, including data exchange with various user devices 101a-101n, is performed with respect to complementary executions of modules at the devices as described later on with respect to FIG. 3. By way of example, the synchronization platform 103 may include a synchronization management module 201, a content retrieval module 203, a time reference module 205, a shared content membership module 207, a user interface module 211 and a communication interface 213. In addition, the synchronization platform 103 also maintains user profile data 111 that is useful for enabling a subscribing device to readily engage participant devices for sharing synchronized content. It is noted therefore, that the synchronization platform 103 may be provided to device users as a service by a service provider (e.g., wireless services provider, internet service provider, broadcast media services provider, etc.).

In one embodiment, the synchronization management module 201 receives a request from a primary user device 101a of a user, i.e., the request indicating availability of the user device 101a for sharing synchronized content with other user devices 101. The primary device 101a is the device that other participant (or secondary) devices should synchronize the playback of their content to. The request, as generated at the primary user device 101a, may include: an announcement of the device's availability or desire to engage other interested devices for viewing the same content, of versions thereof, in a synchronized manner; specific details regarding the device such as a device identifier, resource characteristics and playback buffer allocation; the device's location (e.g., for determining its proximity) and details regarding the content it is executing at the present moment (e.g., file sizes, format characteristics, compression statistics, metadata, content sources, etc.); and timing information, including a system time of the device and/or a current playing time of the media application. This information can be associated with a user profile 111 as maintained for the user/user device.

The requests are stored to data storage 215 for subsequent analysis or retrieval. Generally, the announcement pertains to the sharing of content that is already in play by the user device 101a, although it is noted that in certain instances, the request may pertain to content to be executed by the device at a scheduled time. By way of example, the request received by the synchronization management module 201 may correspond to a future content broadcast event (e.g., a television program), a scheduled really simple syndication (RSS) feed, a conditional request wherein certain conditions or events automatically trigger content transmission, etc. It is noted the synchronization management module 201 is configured to account for all the above content sharing request types and criteria for enabling content synchronization.

In one embodiment, a time reference module 205 accesses the data specified in the request as maintained in data storage 215 and identifies a reference time of the requesting device. Alternatively, this information is retrieved from user profile data 111, i.e., as stored during a prior attempt at content sharing and synchronization. The reference time corresponds to a system time and/or process time of the primary user device 101a as it corresponds to the shared content request. In the case of a process time, the time reference may correspond to an instance of time of execution of the media application for content playback, while in the case of a system time may correspond to an instance of the internal clock settings of the user device 101. The time reference may also be identified based on time stamp data associated with the request, while in other instances, the request explicitly specifies time reference data (e.g., wherein the request is generated by a synchronization request module of the user device 101). Any means of associating specific time information about the primary device with participating user devices for enabling synchronized execution between all devices is applicable. The time reference module 205 sets the retrieved time information as an absolute time reference for establishing a point/moment/time of execution of content by the primary device 101a. It is noted the time reference module 205 may account for network latencies, delays, distance between respective devices and other conditions that may affect the time reference data.

In one embodiment, the time reference information identified by module 205 is then passed on to a delta generation module 203 for enabling generation of a delta (or difference) value. The delta value represents a time differential or lag between execution of content at the primary device 101a and execution of content by any participant devices playing (or wishing to begin playing of) the same content, or versions thereof, in a synchronized manner with the primary. A shared content membership module 207 operates, in certain embodiments, in connection with the delta generation module 203 for maintaining a listing of the various user devices 101n interested in receiving synchronized content based on the time reference of the primary device 101a in response to a synchronization and sharing request. Hence, a unique delta value corresponding to each device of interest (e.g., participant user devices 101n) is generated for representing the differential between the primary device and all participating devices. The content membership module 207 also accounts for the relative proximities of participating devices, so as to ensure those devices conform to a predetermined proximity as defined by the user for enabling sharing of content. In certain instances, the content membership module 207 may restrict devices that are outside of the predetermined range, adjust range settings dynamically to accommodate certain users, etc. The determined (current) proximity of a participating device may also be detected based on geographic, location or spatio-temporal data indicated with a participating device's acceptance request.

In certain embodiments, the delta value represents a difference between an absolute time reference of the primary device and that established for a secondary device 101n upon its interaction with the synchronization platform 103. Similarly, delta corresponds to a determined content execution (e.g., play starting) differential between a primary device 101a and participant devices 101n. The delta generation module 203 computes the delta value based on various factors, including the request time stamp information, system time, application (playing) time and process time. It is noted also that delta value can be generated to account for network latency and/or delay times created by the network 105 and 107. It is further noted that delta information can be maintained in a user profile record 111 pertaining to the user device 101.

In one embodiment, the various protocols, data sharing techniques and the like required for enabling collaborative execution between user devices 101a-101n over the communication network 105 is provided by way of a communication module 213. As the various user devices 101a-101n may feature different communication means, the communication module 213 allows the synchronization platform 103 to adapt to these needs respective to the required protocols of the network 105 and 107. In addition, the communication module 213 may appropriately package data for effective receipt by a respective user device 101a-101n. By way of example, the communication module 213 packages delta data generated by the delta generation module 203 for transmission to respective user devices 101.

Figure 2B:
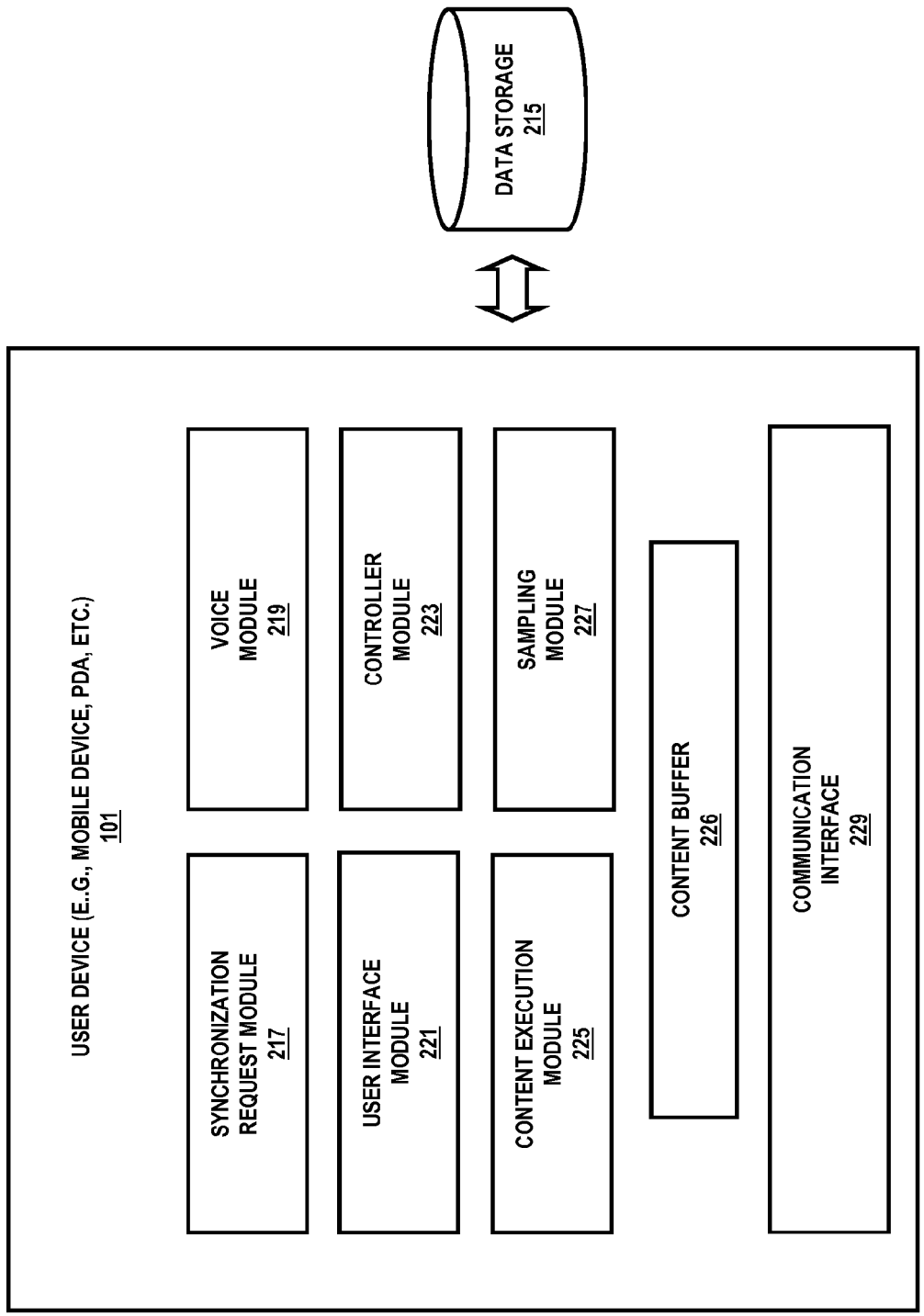

FIG. 2B is a diagram of a user device configured to enable playback of content synchronously in connection with a plurality of participant user devices, in accordance with an exemplary embodiment. The user device 101, which may be a mobile phone, mobile computer, laptop or other wireless communication device includes a synchronization request module 217 that is configured to generate request messages for indicating the sharing of synchronized content for playback (or presentation) by participant devices. In certain embodiments, the user device 101 may also be implemented as a set-top box or any device capable of processing content (e.g., audio/video (AV)) signals for presentation to a user, such as a home communication terminal (HCT), a digital home communication terminal (DHCT), a stand-alone personal video recorder (PVR), a television set, a digital video disc (DVD) player, a video-enabled phone, an audio/video-enabled personal digital assistant (PDA), and/or a personal computer (PC), as well as other like technologies and customer premises equipment (CPE).

As mentioned above, the request generated by the synchronization request module 217 is transmitted to the synchronization management module 201 of the synchronization platform. Information packaged along with the request includes time reference information of the device and current playback buffer settings. It is noted that this execution of module 217 accounts for when the device 101 is the first device among a group to initialize a content sharing and synchronizing request.

Alternatively, the synchronization request module 217 may also receive requests from another user device for indicating potential coordination of a content sharing and synchronization session. By way of example, this execution is similar to that of the synchronization management module 201 of the platform 103 where the request is initiated by a primary device rather than user device 101. Under this scenario, the synchronization request module 217 operates in connection with a user interface module 221, according to one embodiment, for enabling a request notification message to be presented to a display of the user device 101. The notification may be presented to indicate the user and/or user device wishing to initiate the synchronized content sharing session, their location, the content to be coordinated for synchronous execution, the length of the file and other pertinent data packaged along with a request message. A user of the receiving device 101 can then respond to the request by accessing the same content or ignoring the synchronization request entirely. Under the former scenario, the synchronization request module 217 transmits an acknowledgement to the platform 103, and specifically the shared content membership module 207, for indicating its interest in acquiring the shared content on a synchronized basis in connection with the primary device. It is noted that the synchronization request notification message presented to the user device 101 may also feature a link or button for enabling downloading or streaming of a version of the content being played by the primary device 101a.

As mentioned above, the user interface module 221 enables presentment of data to the graphical user interface of the user device 101 according to one embodiment. Various software applications operable by the user device may feature APIs or other function calls corresponding to the user interface module 221 for enabling graphical elements to be displayed by the device. It is noted that in some instances multiple communication interfaces may be utilized depending on the type of user device 101 involved. Moreover, the user device 101 employs the user interface module 221 to enable control by the user of the device 101 of various communication features during a session. Additionally, a controller module 223 is configured in one embodiment to regulate the communication processes between the various modules. For example, the controller module 223 generates the appropriate signals to control the communication interface 229 for transmission over the service provider 105 and communication network 107. A wireless carrier network, such as in the case of the user device 101 being implemented as a mobile phone or computing device, may be configured by way of the service provider 105 and communication network 107 appropriately to enable radio frequency (RF) communication. Alternatively, a television or media broadcast service provider may be configured to network 105 and 107 for enabling synchronized content to be coordinated from a display configured to a set-top box.

In accordance with an embodiment, the device 101 also includes a voice module 219 configured to establish a voice-based call. Such voice-based calls can be traditional plain-old-telephone service (POTS) calls or packetized voice calls (e.g., VoIP). These communication sessions can occur concurrently during a call. It is noted that these communication sessions can be established over a circuit-switched network, a packet-switch network or a combination thereof. Thus, communication interface 229 can be appropriately configured depending on the transport systems and/or service provider 105 or communication network 107 elements involved.

According to one embodiment, a content execution module 225 enables the viewing, playing and/or rendering of digital content maintained in data storage 109 as provided by the media services provider 115 via the network 105 and 107. Likewise, the content execution module 225 executes the appropriate instructions for decoding the received content properly, including the processing of video/audio codecs, the performance of various compression or decompression techniques, buffer control, etc. Exemplary applications useful for execution as, or in connection with the content execution module 225 may include, but are not limited to, a digital media player, an MP3 player or other audio player, a video player, a podcast feedback application or any other software utility suited for the execution of content of various formats. Exemplary formats for video content may include, but is not limited to, MPEG, AVI, Real Video and QuickTime, while exemplary audio formats aside from MP3 may include, but is not limited to AAC, WMA, WAV and AIFF. In the case of video and/or audio content, the user interface module 221 operates in connection with the content execution module 225 and controller module 223; for example, to render video content to the graphical user interface and audio content to the internal speakers of the user device 101.

In addition, the content execution module 225 operates in conjunction with a content buffer 226 to adjust, for example, depth of the buffer 226 for a content playback to match that of the primary device. By way of example, the content execution module 225 makes an adjustment to its buffer 226 based on the determined buffer setting indicated for the synchronization request. Hence, the buffer setting of the receiving device 101 is in certain instances expanded or contracted accordingly to as to enable synchronized playback of the same content. It is noted that the context execution module 225 may account for the overall resource and device memory capacity of user device 101 when enabling buffer settings to be adjusted.

In one embodiment, a sampling module 227 operates to retrieve audio content as executed by one or more devices within a predetermined proximity of one another. By way of example, the sampling module is able to perform bit rate distinction, sound variance, etc. for performing audio sampling. Audio signals are detected by way of a microphone coupled to the device. As the sampling module distinguishes the subtle or explicit variances of audio content in execution by devices, this variance (frequency response) can be translated to a specific delay time. The delay time can then be used as a delta value to be shared among devices for synchronizing media playback. Based on the determined delta, the playback of respective devices can be adjusted to correspond to the same point in time of execution of content as played on the primary device. As before, a time differential is relied upon to enable synchronization of content on respective devices.

Figure 3:
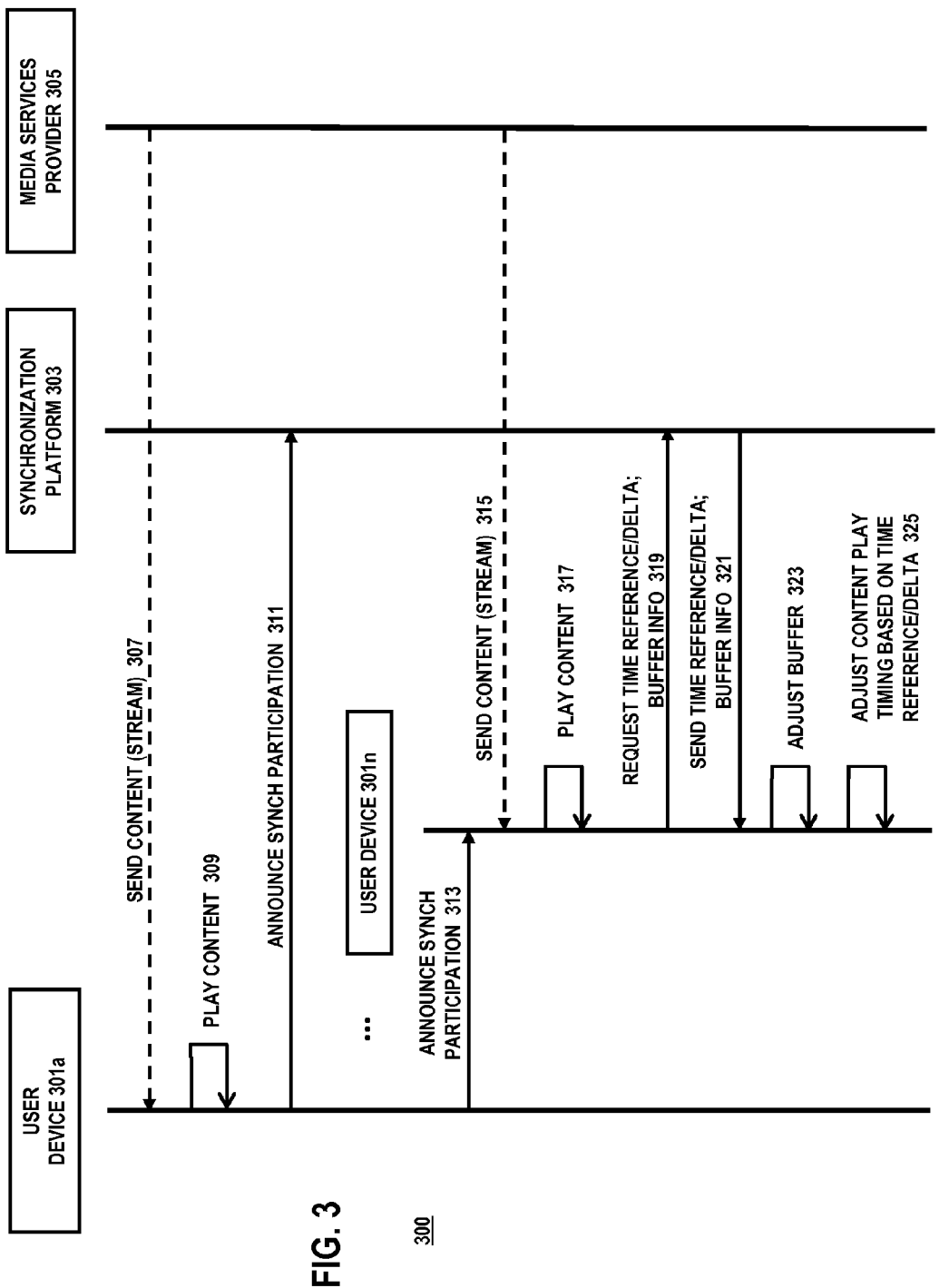
FIG. 3 is a ladder diagram showing a process for content synchronization among multiple user devices, according to an exemplary embodiment.

FIG. 3 is a ladder diagram showing a process for content synchronization among multiple user devices, according to an exemplary embodiment 113. Under this scenario, the interactions can occur over a service provider 105 and communication network 107. In an interaction 307 between the media services provider 305 and the user device 301a, content is received by the user device 301 as a content stream. In another interaction 311 between the user device 301a and the synchronization platform 303, the user device 301a announces its willingness to synchronize and share content with participant devices. The same interaction 313 may also occur between the user device 301a (e.g., a primary device) and participant devices 301n directly. The announcement is presented to the synchronization platform 303 in the form of a request that includes various data pertaining to the user and/or user device, including time reference data, buffer settings data, content related data and other characteristics. When presented to participant devices 301n directly, the above described information can also be presented with instructions for allowing a user to subscribe to (e.g., first time) or accept (e.g., prior participant) the synchronization service.

The participant user devices 301n may either reject (e.g., non-participants) or accept (participate in) the synchronization request. When a user device 301n responds affirmatively, an interaction 315 occurs between the participant user device 301n and the media services provider 305 for enabling exchange of the same content (or a version thereof) as the primary user device 301a. Once the content is received and played 317, interactions 319 and 321 between user device 301n and the synchronization platform 303 occur for enabling the request and subsequent exchange of time reference data, delta information and buffer settings information. As a result of interactions 319 and 321, the participant user device 301n dynamically adjusts its buffer settings 323 for affecting its content execution play timing 325; the execution of the content on the participating user device 301n being synchronized with that of the primary user device 301a. It is noted that the adjustment at the participant device 301n is triggered by receipt of a signal from the synchronization platform 303 for indicating the required buffer and timing information.

Figure 4A:
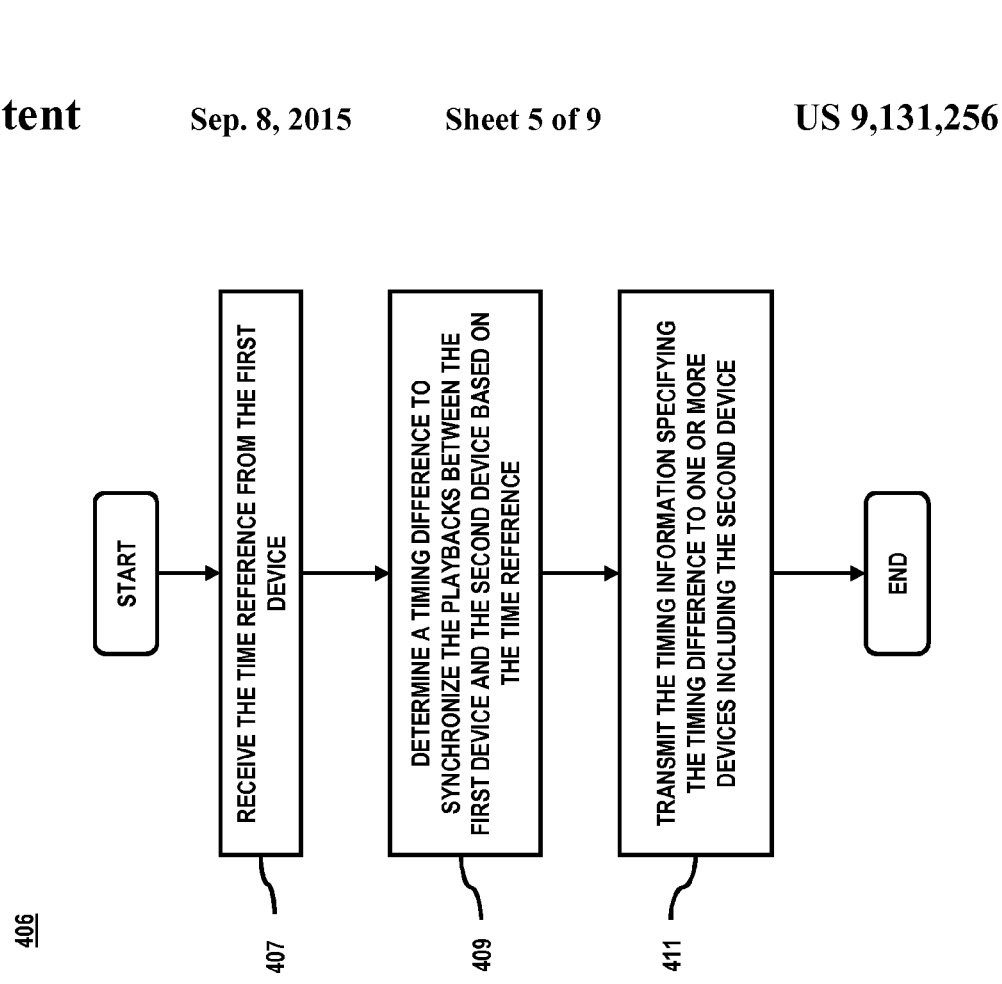
FIGS. 4A and 4B are flowcharts of processes for generating timing information for synchronizing content on a group of user devices, according to various embodiments.
Figure 4B:
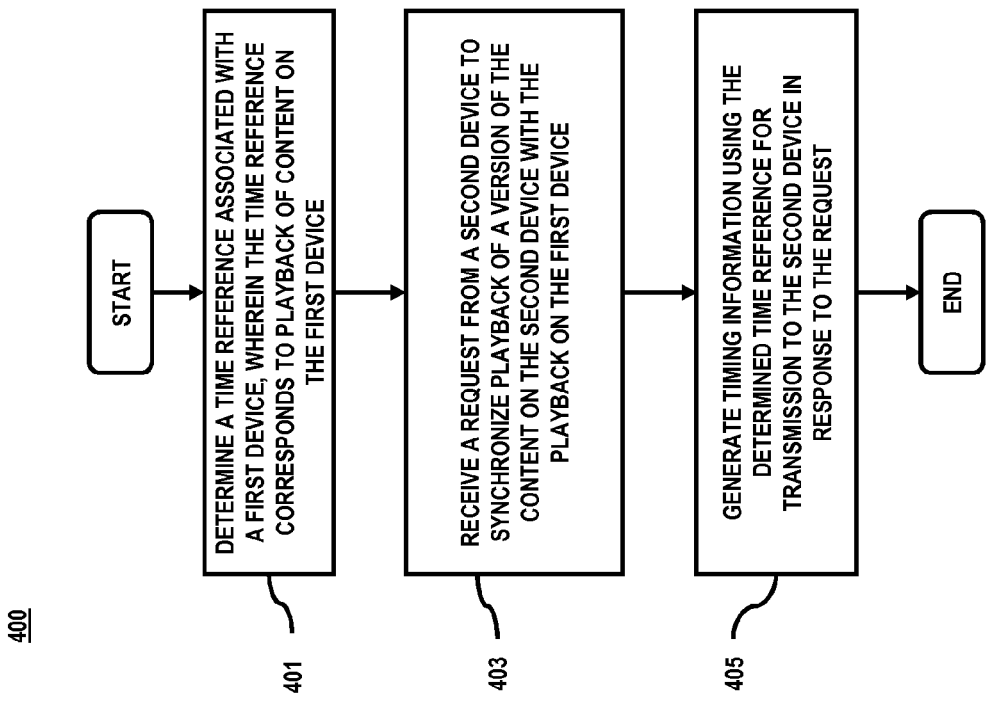

FIGS. 4A and 4B are flowcharts of processes for generating timing information for synchronizing content on a group of user devices, according to various embodiments. For the purpose of illustration, the processes are described with respect to the system 100 of FIG. 1. It is noted that the steps of the process may be performed in any suitable order, as well as combined or separated in any suitable manner. In step 401 of process 400, a time reference associated with a first device 101a is determined by the synchronization platform 103. The time reference as determined corresponds to playback of content on the first device 101a. In one embodiment, the synchronization platform 103 will recognize the first device 101a as a primary device—i.e., the device that initiated a service request, including time reference data, for enabling synchronized execution of content with various participating devices. Alternatively, platform 103 can retrieve user profile data to determine which device is designated as the primary—e.g., depending on the presence of the participant devices, such profile data may specify a hierarchy representing the order in which a device should be designated.

In step 403, the synchronization platform 103 receives a request from a second device 101n to synchronize playback of a version of the content on the second device 101n with that of the first device 101a. As mentioned previously, the second device 101n is within a predetermined proximity to the first device 101a (e.g., local, within signal range, within the same premise). In step 405, the synchronization platform 103 generates timing information—a delta value—using the determined time reference information as received. The timing information is generated for transmission to the second device 101n in response to the request from the second device.

Process 406 pertains the generation of timing information. In step 407, time reference information is received from the first device 101a (e.g., primary device). The synchronization platform 103 determines a timing difference to synchronize the playbacks between a first device and a second device, according to step 409. The timing difference is based on a differential between a time reference or playback time information determined for the second device 101n and the time reference of the first device 101a. In step 411, the synchronization platform 103 transmits the timing information specifying the timing difference to one or more devices, including the second device. This timing information enables synchronized execution of the content to be coordinated by respective devices 101a-101n.

Figure 5B:
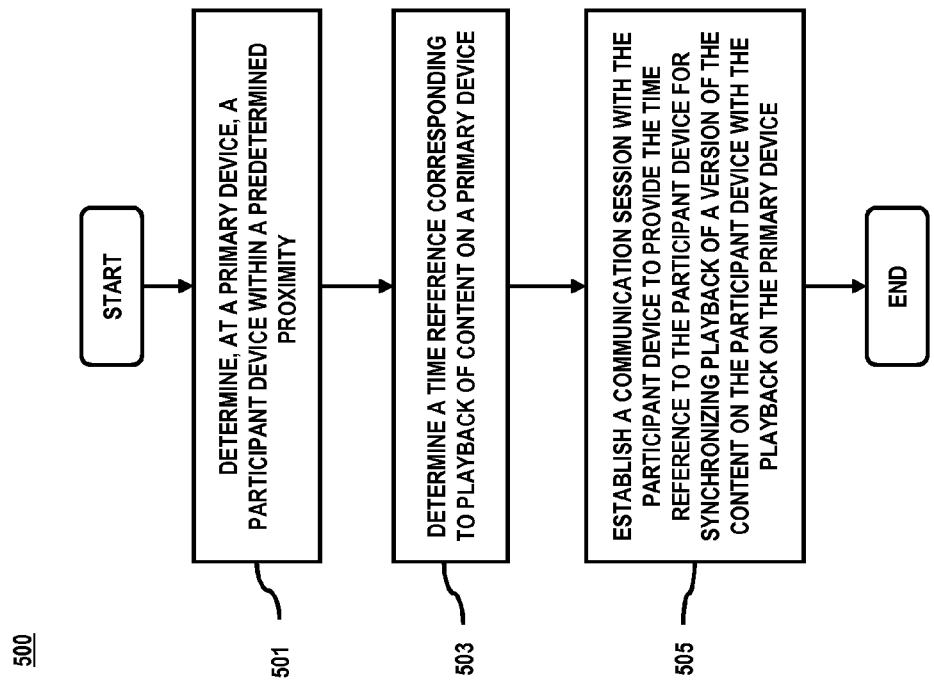
FIGS. 5A and 5B are flowcharts of processes for adjusting playback for synchronization with a primary device, according to various embodiments.
Figure 5A:
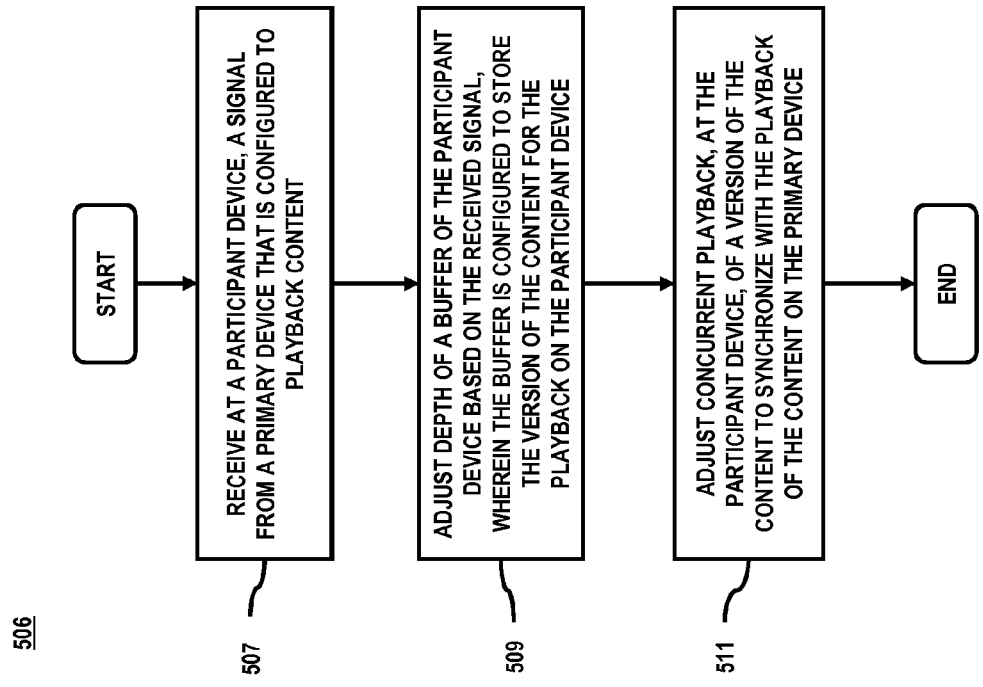

FIGS. 5A and 5B are flowcharts of processes for adjusting playback for synchronization with a primary device, according to various embodiments. For the purpose of illustration, the processes are described with respect to FIG. 1. It is noted that the steps of the process may be performed in any suitable order, as well as combined or separated in any suitable manner. In step 501 of process 500, a participating device 101n within a predetermined proximity of a primary device 101a is determined. The determination process may occur by way of accessing a user profile 111 corresponding to the user of primary device 101a, through a sensor detection means (e.g., Bluetooth), through configuration to a common portal or wireless connection or other determination means. In step 503, a time reference corresponding to playback of content on a primary device is determined. In another step 505, a communication session is established with the participant device to provide it with a time reference for synchronizing playback of a version of the content on the participant device with that of the primary device.

In step 507 of process 506, a participant device 101n receives a signal from primary device 101a that is configured to playback content. It is noted that both devices may be configured for interacting with the synchronization platform 103, or alternatively, the primary device may be solely configured. Under the scenario where only the primary device 101a is configured, the participant device 101n may subscribe for a first time with a service provider of the synchronization platform 103, subscribe as a first time participant (e.g., buddy) of the user of the primary device, etc. In a step 509, the participant device 101n adjusts its buffer depth based on the signal received with respect to the primary device 101a. As mentioned, the buffer is configured to store the version of the content for the playback on the participant device 101n. In another step 511, the participant device 101n adjusts playback of a version of the content being played back on the primary device. The playback on the participant device 101n is synchronized with that of the primary device as a result of the adjustment.

Figure 6:
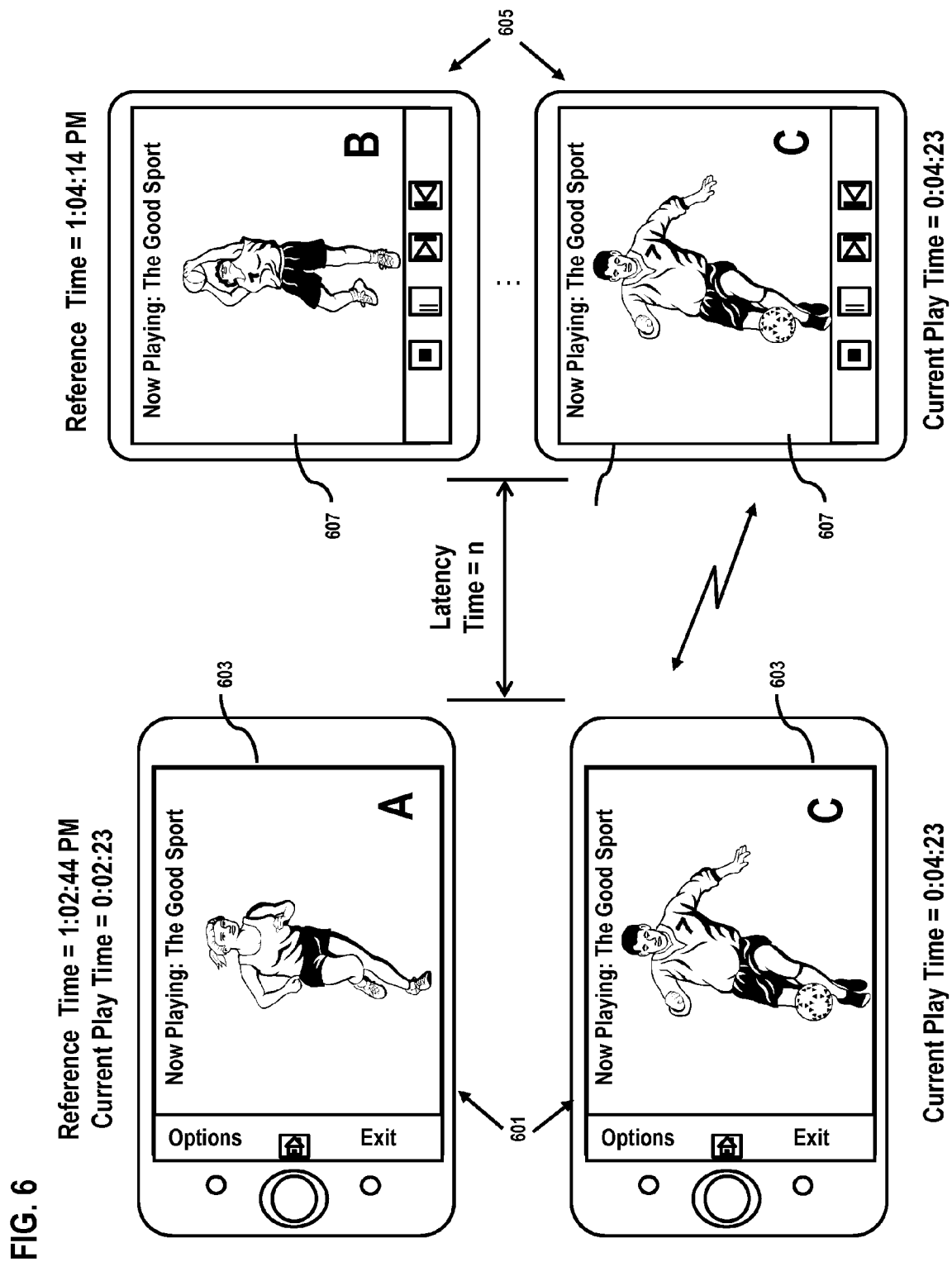
FIG. 6 is a diagram of graphical user interfaces (GUIs) of devices for presenting content synchronously, according to an exemplary embodiment.

FIG. 6 is a diagram of graphical user interfaces (GUIs) of devices for presenting content synchronously, according to an exemplary embodiment. In one embodiment, a primary device 601 executes media content (e.g., a movie) as rendered to its display 603. The user of the device 501 initiates a content synchronization request with a service provider via the synchronization platform 103, so as to synchronize playback of the content (or a version thereof) with a participant device 605. The request may include, in addition to the announcement, timing information pertaining to the presentation of the content 603 including time reference information of the primary user device 601, a current playing time of the content, or combination thereof. By way of example, the reference time corresponds to a time of 1:02:44 PM, while a current play time corresponds to an elapsed time of 00:02:23. The elapsed time in this example corresponds to a current scene or segment of the movie labeled A. The synchronization platform (not shown) also accounts for a latency time n that may occur due to device proximities or network conditions.

As mentioned before, the participant device 605 can accept the synchronization request initiated by the primary device 601 and subsequently, begin playback of a version of the same content (e.g., from the same or a different source). By way of example, the participant device 605 currently presents to its display 607 a scene or segment of the movie B. In order to synchronize its playback with that of the primary device 603, time differential information must be determined and provided to all participant devices. The participant device provides its reference time information as 1:04:14 PM to the synchronization platform 103, representing a 1.5 minute differential between reference times of the primary 601 and participant 605 devices. This differential is then used by the participant device for enabling it to synchronize its version of the content to correspond to that of the primary device 601. In accordance with this execution, primary device 601 and participant device 605 present a scene or segment of the movie C at elapsed play time 00:04:23 in unison. It is noted that buffer settings of respective devices, if they differ, may also be increased or decreased accordingly to ensure parity of playback.

In the various embodiments presented above, it is shown that buffer settings, current play timing, reference time and differentials thereof for a group of devices can impact playback rates amongst different devices desiring to present the same version of content simultaneously (or concurrently). The exemplary techniques and system presented provides a means of effectively determining these characteristics, analyzing them for establishing relative differentials, and ensuring the sharing of such information to coordinate synchronized playback and execution of content at each device. By way of example, a first user of a primary device can decide to host or initiate a synchronization session (e.g., a music party) with a select group of friends via each user's mobile audio devices. According to the techniques presented herein, the user may simply select participants from a network playlist (e.g., buddy list) and activate the synchronization service. Participants may then acknowledge their participation, get added to the synchronization list, and receive the music being played by the first user's device to their participating device the playback of the music being synchronized for all devices.

As another example, a host of a party (in which the users are there to view a sporting event) may present the game on multiple screens configured to one or more set-top boxes (e.g., televisions) throughout the house, each featuring different buffer depths. If the rate of display and playback of the game on each device is unsynchronized, the host can arrange to synchronize each display for simultaneous playback of the televised broadcast. Under this scenario, a widget or embedded application at a primary set-top box may be activated for enabling the host to access the synchronization service. The host can further allow the one or more other set-top boxes to be associated with the primary as participants. The differential in buffer settings may then be brought into parity dynamically, by way of communication with the synchronization platform, for enabling simultaneous synchronized playback of the game.

The processes described herein for providing synchronized content to multiple devices may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
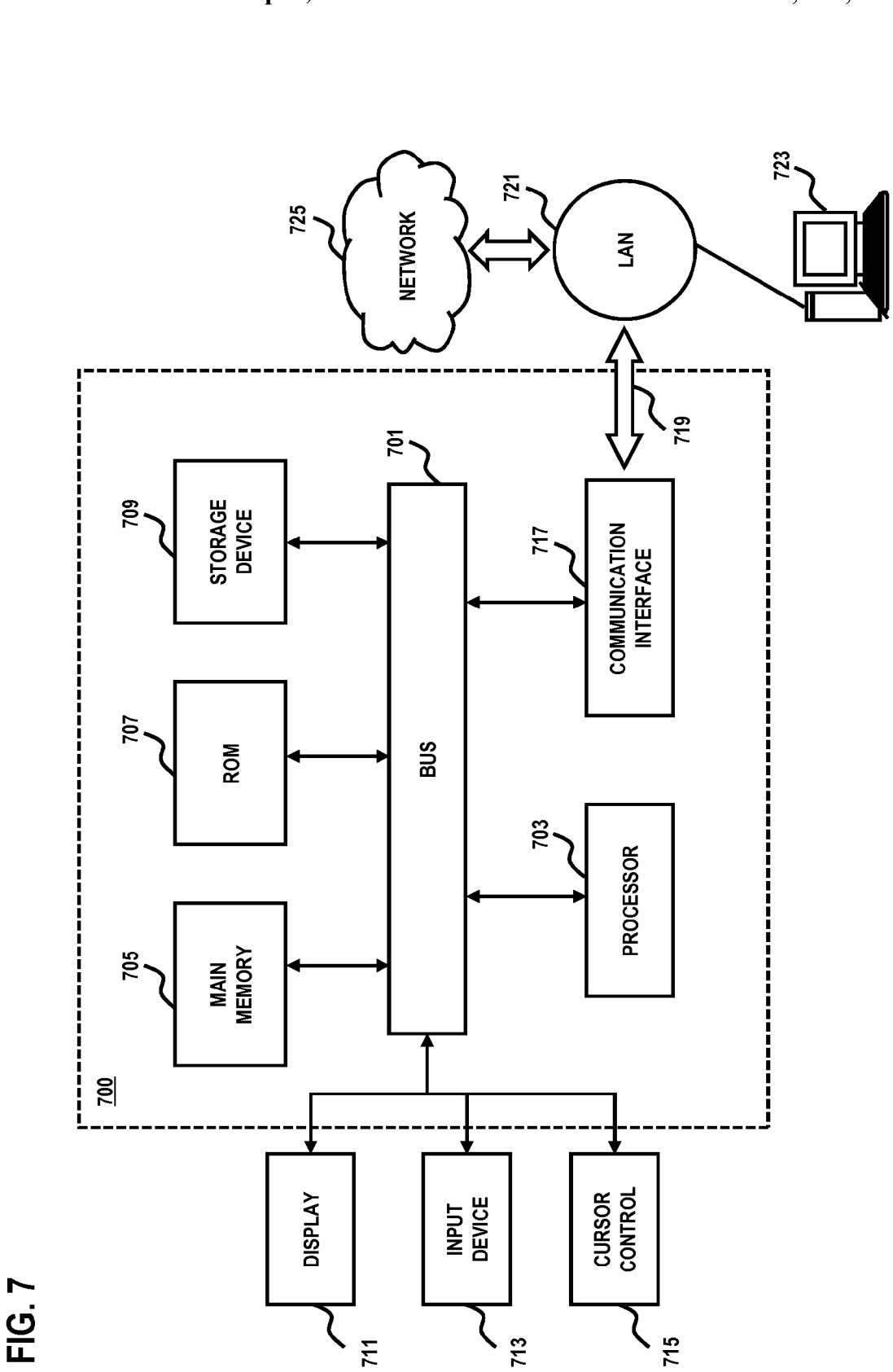
FIG. 7 is a diagram of a computer system that can be used to implement various exemplary embodiments.

FIG. 7 illustrates computing hardware (e.g., a computer system) upon which these embodiments can be implemented. The computer system 700 includes a bus 701 or other communication mechanism for communicating information and a processor 703 coupled to the bus 701 for processing information. The computer system 700 also includes main memory 705, such as random access memory (RAM) or other dynamic storage device, coupled to the bus 701 for storing information and instructions (computer program code) to be executed by the processor 703. Main memory 705 also can be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to certain embodiments, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the invention. Thus, embodiments of the invention are not limited to any specific combination of hardware circuitry and software.

The computer system 700 also includes a communication interface 717 coupled to bus 701. The communication interface 717 provides a two-way data communication coupling to a network link 719 connected to a local network 821. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the invention through the network 825, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 8:
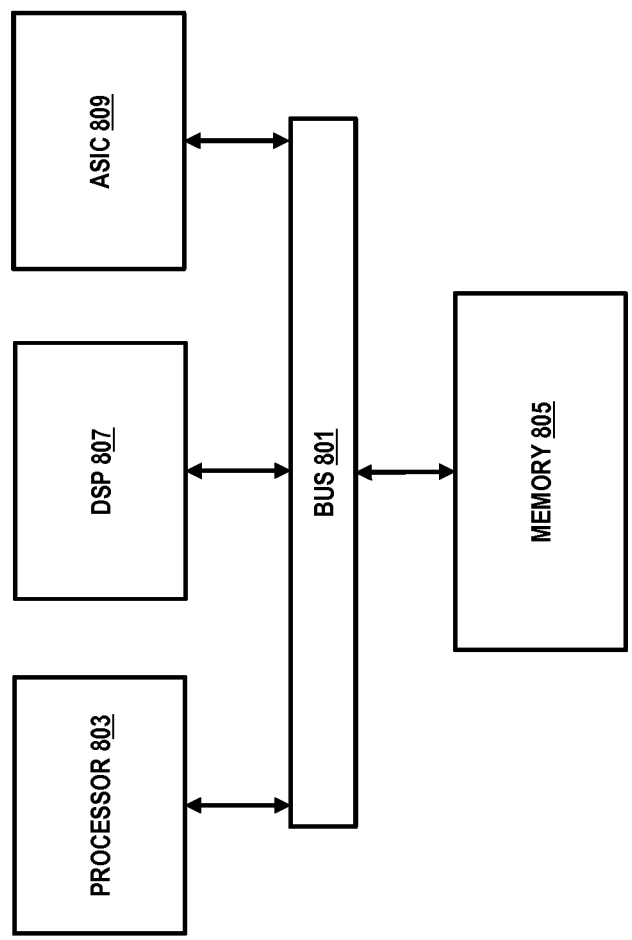
FIG. 8 is a diagram of a chip set that can be used to implement various exemplary embodiments.

FIG. 8 illustrates a chip set 800 upon which an embodiment of the invention may be implemented. Chip set 800 is programmed to present a slideshow as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of FIGS. 4A-5B.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 805 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   determining by a server a time reference associated with a first device, wherein the time reference corresponds to playback of a first unicast feed of content from a content provider on the first device;
   receiving a request at the server from a second device to synchronize playback of a second unicast feed of the content from the content provider on the second device with the playback on the first device;
   generating by the server timing information using the time reference for transmitting the content to the second device in response to the request;
   determining by the server a timing difference to synchronize the playbacks between the first device and the second device based on the time reference, wherein the timing difference is caused, at least in part, by a buffer size difference between the first device and the second device;
   causing, at least in part by the server, a size adjusting of a buffer of the second device based on the buffer size difference and overall resource and device memory capacity of the second device, wherein the buffer is configured to store the content for the playback on the second device; and
   causing, at least in part, sampling, by the second device, playback of the content on the first device, wherein the time reference is further modified based on the sampled playback, and the size of the buffer is further adjusted based on the modified time reference, and wherein the second device is within a predetermined proximity to the first device that is subject to signal interference, and the time reference is an absolute time reference.

2. A method according to claim 1, further comprising:
   establishing a user profile for a synchronization service, wherein the user profile specifies the first device and the second device as associated with a common user account.

3. A method according to claim 1, further comprising:
   receiving the time reference from the first device; and
   transmitting size adjusting information and the timing information specifying the timing difference to one or more devices including the second device,
   wherein the second device is within the predetermined proximity to the first device that is subject to audio interference, and the playback of the content on the first device is sampled via a microphone coupled to the second device.

4. A method according to claim 3, wherein the second device is configured to utilize the timing information to adjust the buffer to synchronize the playback of the content with the playback on the first device.

5. An apparatus comprising:
   at least one processor; and
   at least one memory including computer program code for one or more programs,
   the at least one memory and the computer program code configured to, with the at least one processor, cause the apparatus embedded in a server to perform at least the following,
   determine a time reference associated with a first device,
   receive a request from a second device to synchronize playback of a second unicast feed of content from a content provider on the second device with playback of a first unicast feed the content from the content provider on the first device, wherein the second device is within a predetermined proximity to the first device,
   generate timing information using the time reference for transmission the content to the second device in response to the request;
   determine a timing difference to synchronize the playbacks between the first device and the second device based on the time reference, wherein the timing difference is caused, at least in part, by a buffer size difference between the first device and the second device;
   cause, at least in part, a size adjusting of a buffer of the second device based on the buffer size difference and overall resource and device memory capacity of the second device, wherein the buffer is configured to store the content for the playback on the second device; and
   cause, at least in part, sampling, by the second device, playback of the content on the first device, wherein the time reference is further modified based on the sampled playback, and the size of the buffer is further adjusted based on the modified time reference, and wherein the second device is within a predetermined proximity to the first device that is subject to signal interference, and the time reference is an absolute time reference.

6. An apparatus according to claim 5, wherein the time reference is generated by the first device.

7. An apparatus according to claim 5, wherein the apparatus is further caused to:
- receive the time reference from the first device;
- determine a timing difference to synchronize the playbacks between the first device and the second device based on the time reference; and
- transmit the timing information specifying the timing difference to one or more devices including the second device.

8. An apparatus according to claim 5, wherein the second device includes a buffer for presenting the second unicast feed of the content, and is configured to utilize the timing information to adjust the buffer to synchronize the playback of the second unicast feed of the content.

9. An apparatus according to claim 5, wherein the apparatus is further caused to:
- establish a user profile for a synchronization service, wherein the user profile specifies the first device and the second device as associated with a common user account.

10. A method comprising:
- determining, at a primary device, a participant device subject to signal interference within a predetermined proximity of the primary device;
- determining, at the primary device, a time reference corresponding to playback of a first unicast feed of content from a content provider on the primary device;
- determining, at the primary device, a timing difference to synchronize the playback by the primary device with a playback of a second unicast feed of the content from the content provider on the participant device based on the time reference, wherein the timing difference is caused, at least in part, by a buffer size difference between the primary device and the participant device;
- establishing, by the primary device, a communication session with the participant device to provide the time reference and the timing difference to the participant device for the synchronizing;
- causing, at least in part, a size adjusting of a buffer of the participant device based on the buffer size difference and overall resource and device memory capacity of the participant device, wherein the buffer is configured to store the content for the playback on the participant device; and
- causing, at least in part, sampling, by the participant device, playback of the content on the primary device, wherein the time reference is further modified based on the sampled playback, and the size of the buffer is further adjusted based on the modified time reference, and wherein the time reference is an absolute time reference.

11. A method according to claim 10, wherein the communication session is over a wireless link, and the participant device is determined as subject to audio interference within the predetermined proximity of the primary device.

12. A method according to claim 10, wherein the devices include either a computing device, a mobile phone, or a set-top box.

13. A method according to claim 10, further comprising:
- generating a request to subscribe to a synchronization service for synchronizing playback of the content among a plurality of devices.

14. A method according to claim 13, wherein each of the devices is configured to execute a synchronization application to communicate with the synchronization service.

15. A method comprising:
- receiving, at a participant device, a signal from a primary device that is configured to playback a first unicast feed of content from a content provider, wherein the signal includes a time reference corresponding to the playback by the primary device and a timing difference to synchronize the playback by the primary device with a playback of a second unicast feed of the content from the content provider on the participant device based on the time reference, and the timing difference is caused, at least in part, by a buffer size difference between the primary device and the participant device;
- in response to the received signal, adjusting, at the participant device, a size of a buffer of the participant device based on the buffer size difference and overall resource and device memory capacity of the participant device, wherein the buffer is configured to store the content for the playback on the participant device; and
- sampling, by the participant device, playback of the content on the primary device, wherein the time reference is further modified based on the sampled playback, and the size of the buffer is further adjusted based on the modified time reference, and wherein the participant device is subject to signal interference within a predetermined proximity of the primary device, and the time reference is an absolute time reference.

16. A method according to claim 15, wherein the devices include a computing device, a mobile phone, or a set-top box.

17. A method according to claim 15, wherein the signal includes timing information to assist with the synchronization of the playbacks, the method further comprising:
- adjusting depth of a buffer of the participant device based on the received signal, wherein the buffer is configured to store the content for the playback on the participant device.

18. A method according to claim 17, wherein the playback includes an audio signal, the method further comprising:
- sampling the audio signal via a microphone coupled to the participant device, wherein the time reference is determined using the audio signal.

* * * * *